(12) United States Patent
Greb

(10) Patent No.: US 12,533,947 B2
(45) Date of Patent: Jan. 27, 2026

(54) DRIVE TRAIN COMPRISING AN ACTUATING ASSEMBLY AND A COUPLING DEVICE FOR COUPLING AN OUTPUT SHAFT TO A DRIVE AND FOR ACTUATING A PARKING LOCK

(71) Applicant: Schaeffler Technologies AG & Co. KG, Herzogenaurach (DE)

(72) Inventor: Peter Greb, Ottersweier (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 18/840,090

(22) PCT Filed: Feb. 21, 2023

(86) PCT No.: PCT/DE2023/100140
§ 371 (c)(1),
(2) Date: Aug. 21, 2024

(87) PCT Pub. No.: WO2023/160754
PCT Pub. Date: Aug. 31, 2023

(65) Prior Publication Data
US 2025/0162408 A1    May 22, 2025

(30) Foreign Application Priority Data
Feb. 24, 2022  (DE) .................... 10 2022 104 391.6

(51) Int. Cl.
*B60K 17/02* (2006.01)
*B60K 1/00* (2006.01)
(Continued)

(52) U.S. Cl.
CPC ............... *B60K 17/02* (2013.01); *B60K 1/00* (2013.01); *F16D 11/14* (2013.01); *F16D 23/14* (2013.01);
(Continued)

(58) Field of Classification Search
CPC ...... F16H 63/3441; F16H 48/08; F16H 48/10; B60K 17/02; B60K 1/02; F16D 11/14; F16D 2011/002; F16D 2011/004
See application file for complete search history.

(56) References Cited

U.S. PATENT DOCUMENTS 2,883,020 A     4/1959  Kummich et al.
10,968,986 B1   4/2021  Sung et al.
(Continued)

FOREIGN PATENT DOCUMENTS

DE         10224357 A1    12/2003
DE      102011088669 A1    6/2013
(Continued)

OTHER PUBLICATIONS

English language machine translation of FR-2963651-A1, retrieved from www.espacenet.com (Year: 2025).*

(Continued)

*Primary Examiner* — Stacey A Fluhart

(57) ABSTRACT

The disclosure relates to a drive train of a motor vehicle, the drive train including an actuating device for actuating a coupling device for coupling at least one drive wheel to a drive motor and for coupling the drive wheel to a parking lock unit. A shifting sleeve is provided which displaces in the axial direction and thus can successively connect torque interfaces to one another. This makes it possible to sequentially establish a driving state and a parking state of the drive train.

15 Claims, 10 Drawing Sheets

(51) Int. Cl.
  *F16D 11/14*   (2006.01)
  *F16D 23/14*   (2006.01)
  *F16H 63/34*   (2006.01)
  *F16D 11/00*   (2006.01)

(52) U.S. Cl.
  CPC .... *F16H 63/3441* (2013.01); *B60K 2001/001* (2013.01); *F16D 2011/002* (2013.01); *F16D 2300/18* (2013.01)

(56) References Cited

U.S. PATENT DOCUMENTS

2019/0263377 A1* 8/2019 Ikushima ................ B60T 1/062
2021/0394601 A1* 12/2021 Führer ................ F16H 63/3425
2023/0049545 A1* 2/2023 Rosenberg ............ A61M 25/02

FOREIGN PATENT DOCUMENTS

| DE | 102011088669 B4 * | 5/2019 | ........... F16H 63/304 |
| DE | 102018130628 A1 | 1/2020 | |
| DE | 102018211113 A1 | 1/2020 | |
| DE | 102018219518 A1 | 5/2020 | |
| DE | 102021201455 A1 * | 8/2022 | .............. F16D 11/10 |
| DE | 102021006631 A1 * | 4/2023 | ......... F16H 63/3416 |
| FR | 2963651 A1 * | 2/2012 | ......... F16H 63/3441 |
| JP | 2018035972 A * | 3/2018 | |
| JP | 6965792 B2 * | 11/2021 | ............... B60K 1/00 |
| WO | WO-2018095544 A1 * | 5/2018 | ............... B60K 1/00 |

OTHER PUBLICATIONS

English language machine translation of WO-2018095544-A1, retrieved from www.espacenet.com (Year: 2025).*

* cited by examiner

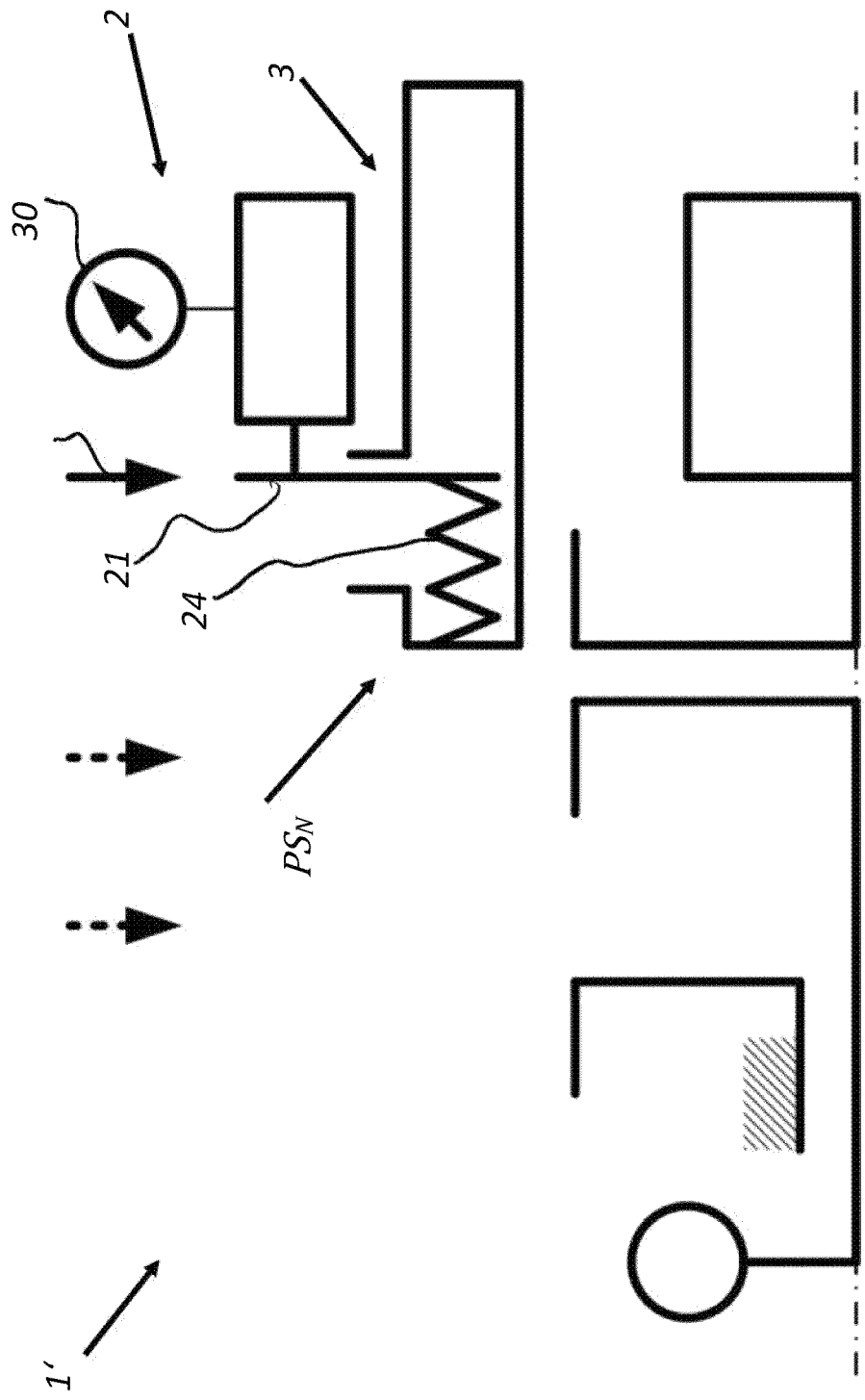

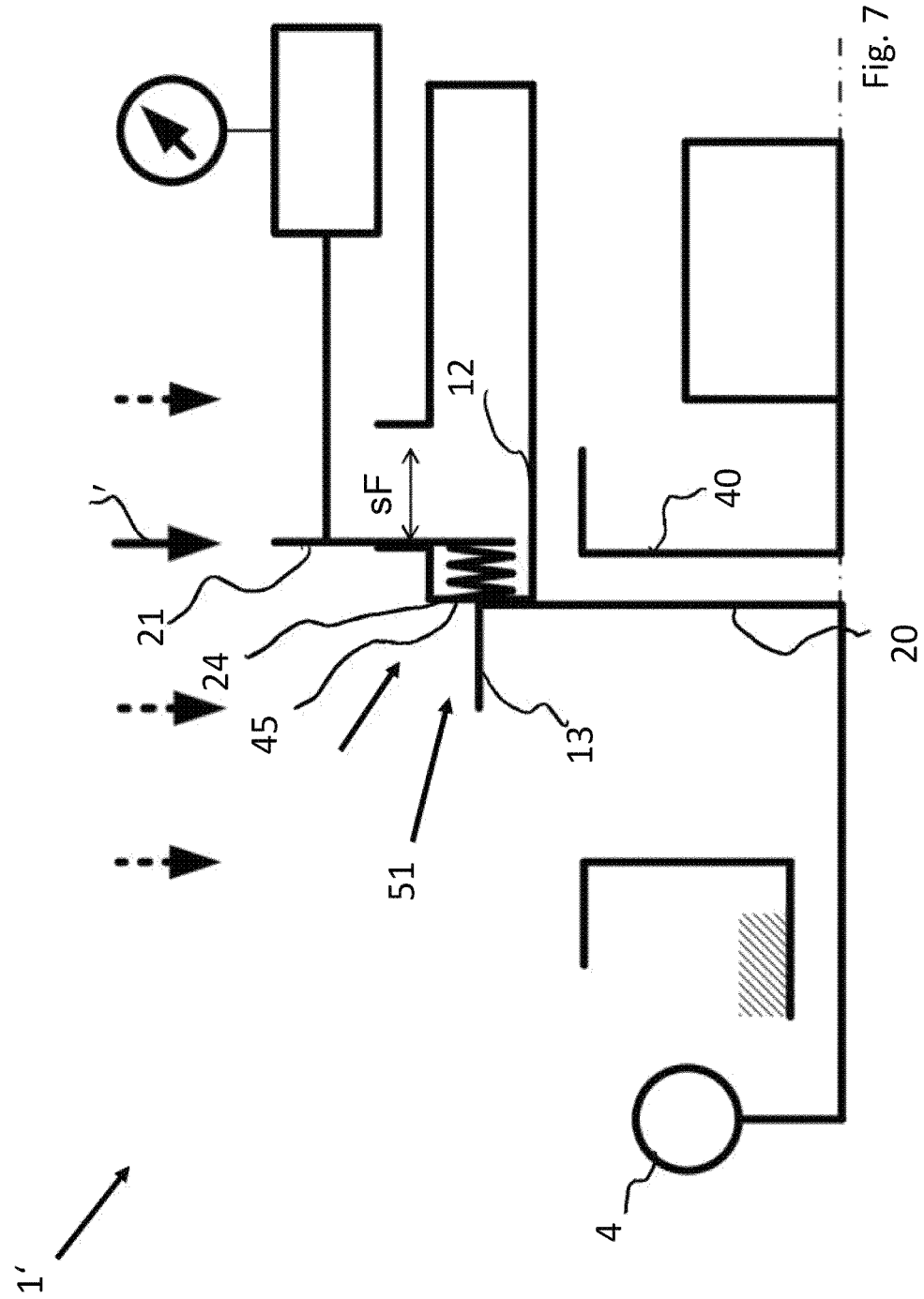

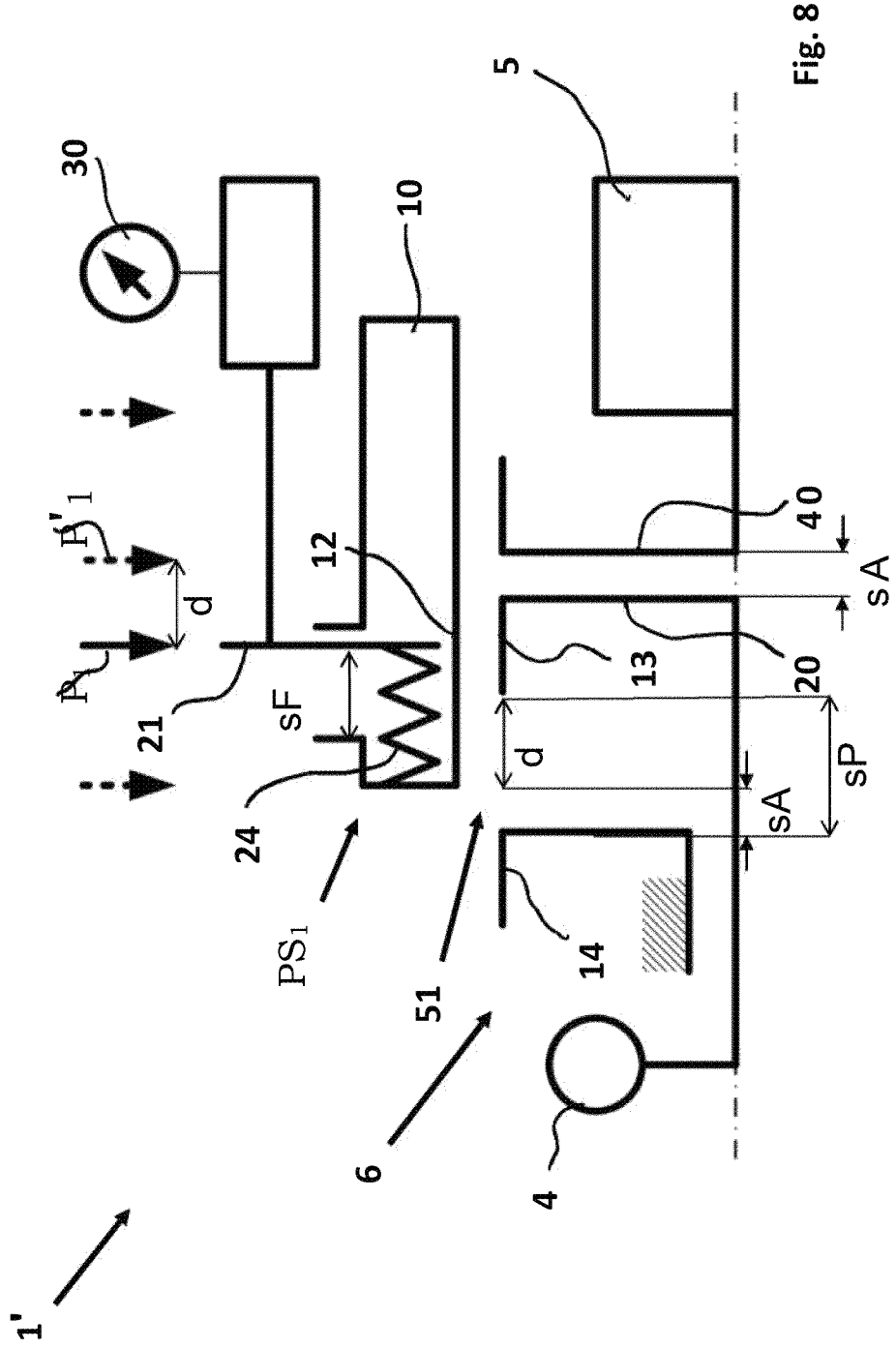

DRIVE TRAIN COMPRISING AN ACTUATING ASSEMBLY AND A COUPLING DEVICE FOR COUPLING AN OUTPUT SHAFT TO A DRIVE AND FOR ACTUATING A PARKING LOCK

CROSS-REFERENCE TO RELATED APPLICATIONS

This application is the U.S. National Phase of PCT Application No. PCT/DE2023/100140 filed on Feb. 21, 2023, which claims priority to DE 10 2022 104 391.6 filed on Feb. 24, 2022, the entire disclosures of which are incorporated by reference herein.

TECHNICAL FIELD

The present disclosure relates to the drive train of a motor vehicle, comprising an actuating device for actuating a coupling device for coupling at least one drive wheel to a parking lock unit. Furthermore, the disclosure also relates to a method for sequentially actuating a first claw clutch and a second claw clutch for the non-rotatable coupling of a drive wheel either with a parking lock unit or a drive motor.

BACKGROUND

A drive train with an actuating device is known from DE 10 2018 130 628 A1, in which the actuating device is designed such that it can actuate both a parking lock and a friction clutch. An over-travel of the actuating device for the friction clutch is provided for this purpose, in which the associated parking lock can be actuated. In order to actuate the friction clutch and the parking lock itself, different actuating elements such as a parking lock claw and actuating lever are provided, on which the actuating device acts separately in different actuating directions.

SUMMARY

The object of the present disclosure is to provide a drive train of the described embodiment in such a way that torque can be transmitted as simply as possible within the drive train from a drive to a drive wheel or that the drive wheels can be locked. Furthermore, a method for the corresponding establishment of a torque transmission or locking is also to be provided.

This object of the disclosure is achieved by a generic drive train according to the features described herein. The object of the disclosure is further achieved according to a method described herein.

According to the disclosure, the coupling device comprises a shifting sleeve which can be axially displaced by means of the actuating device.

For torque transmission from the drive motor to the drive wheel, the drive motor has a torque interface which, in a neutral position PSN of the shifting sleeve, is exclusively coupled to a torque interface of the shifting sleeve.

The drive wheel further has a connecting element with a torque interface. In a first axial position $PS_1$ of the shifting sleeve, this torque interface is coupled to the torque interface of the shifting sleeve, which in this position is also simultaneously coupled to the torque interface of the drive motor.

For this purpose, the torque interface of the shifting sleeve has an axial extension that is sufficient so that, in the first axial position $PS_1$, the torque interface of the shifting sleeve for torque transmission from the drive motor to the drive wheel is coupled both to the torque interface of the drive motor and to the torque interface of the drive wheel. The drive train is then in a "driving state" in which the drive wheel(s) can be driven by the drive motor via the shifting sleeve.

Furthermore, the parking lock unit also has a torque interface to which the torque interface of the shifting sleeve is coupled in a second axial position $PS_2$ of the shifting sleeve.

The axial extension of the torque interface of the shifting sleeve is additionally designed such that, in addition to the above condition, the condition is also fulfilled that in this second axial position $PS_2$ the torque interface of the shifting sleeve is coupled both to the torque interface of the parking lock unit and to the torque interface of the drive wheel. The drive wheels are then locked and the drive train is in a "parking state".

As a third condition, the axial extension of the torque interface of the shifting sleeve is further designed such that at no time is the torque interface of the shifting sleeve coupled both to the torque interface of the parking lock unit and to the torque interface of the drive motor. This is to avoid a locking of the drive as such.

Overall, this design makes it possible to use only one shifting sleeve in order to achieve successively a driving state by establishing a coupling between the drive motor and the drive wheels via the shifting sleeve and then separately a parking state by coupling the drive wheels to the parking lock unit, or vice versa. For this purpose, the torque interfaces of the drive motor, drive wheel and parking lock unit can all be arranged in an aligned manner on a common axis. The shifting sleeve can then implement the described couplings successively with its torque interface.

In a further development, the actuating unit comprises an actuator drive, a shifting element and an actuating element coupled to the actuator drive. In this regard, the shifting element is coupled, on the one hand, to the shifting sleeve and, on the other hand, to the actuating element for axially displacing the shifting sleeve. This means that a movement of the actuating element by the actuator drive can first be converted via the coupling into a movement of the shifting element and then back into a different movement, in this case an axial displacement of the shifting sleeve.

It is also advantageous if the coupling between the shifting element and the shifting sleeve and/or between the shifting element and the actuating element is takes place or occurs via a spring element. This spring element can be arranged between the shifting element and the shifting sleeve. This makes it possible to compensate for a temporary misalignment between the involved torque interfaces when the shifting sleeve is shifted to one of the "driving state" and "parking state." This can be the case, for example, due to a tooth-on-tooth positioning of the toothings. Until one of the torque interfaces then moves accordingly, for example in the circumferential direction, the travel specified by the actuating element cannot be fully converted into a corresponding axial position $PS_1$ or $PS_2$. The energy used for this can then be stored in the spring element and, when the locking is released, lead to an automatic axial displacement of the shifting sleeve for the final coupling of the torque interfaces with one another.

In order to be able to detect a corresponding state of the vehicle, such as the "driving state" or "parking state," the actuating unit can comprise a first displacement sensor for acquiring the linear travel of the shifting element and/or actuating element in the axial direction. When the first or second positions $P_1$ or $P_2$ of the shifting element are reached, it is then possible, for example, to infer the corresponding positions $PS_1$ or $PS_2$ of the shifting sleeve and the associated states of the drive train.

When inferring the axial position of the shifting sleeve from the positions of the shifting element, problems may arise if a temporary locking between the torque interfaces of the drive wheel or the parking lock unit and the shifting sleeve occurs. Although the shifting element then already assumes the axial position associated with a state of the drive train, the shifting sleeve cannot yet follow this movement and the spring element is preloaded accordingly. If the first displacement sensor then already detects a driving state, for example, even though there is no torque-transmitting coupling yet between the drive wheel and drive motor, the drive motor can already be set to the corresponding speeds. A subsequent coupling with the torque interface, which may have a toothing, is then at the very least made more difficult. Damage might also occur.

In a further development, it is therefore possible in a first alternative to provide a second displacement sensor for acquiring the linear travel of the shifting sleeve itself, in addition to the first displacement sensor for acquiring the linear travel of the shifting element and/or the actuating element. In this way, it can be precisely determined whether a corresponding state of the drive train is actually present, regardless of the position information of the first displacement sensor. In particular, the second displacement sensor can be used exclusively to determine the "driving state" and only the first sensor alone is used to detect the "parking state." When the parking lock is engaged, it is also sufficient to recognize the locked state as a parking state, as the drive train is no longer driven and, due to a possible locking, only a relative rotation between the torque interfaces of the drive wheel and shifting sleeve on the one hand and the torque interface of the parking lock unit on the other can occur, which then automatically leads to the locking being overcome and a subsequent coupling of the parking lock unit with the drive wheel.

In a second alternative further development, only the first displacement sensor is provided for determining an axial state of the coupling device and thus of the shifting sleeve. It is further possible that the first displacement sensor alone is provided for determining whether the torque interfaces of the parking lock unit or the drive motor are coupled to one another or to the drive motor, or are to be regarded as coupled. There is then no need to provide a second displacement sensor.

In a further development based on this, the entire coupling device is designed to be sensorless. In other words, a sensor for determining a position or directly determining a state of the shifting sleeve is explicitly not provided.

In order to securely detect at least the "driving state" even when determining the states with only the first displacement sensor or with a sensorless coupling unit, the axial distance between the torque interface of the drive wheel and the parking lock unit can be increased compared to the axial distance between the torque interface of the drive wheel and the drive motor.

Regarding the detection of the driving state, it is then possible that a maximum tensioning of the spring element by the maximum spring travel sF is not sufficient in order to determine the driving state as detected. The spring element is compressed by the maximum spring travel sF at a preliminary first axial position of the shifting element $P'_1$ if a locked state is currently present.

If the locked state is released, which may occur due to rolling of the drive wheels, for example, the spring element relaxes by the spring travel sF. However, the driving state is then not yet detected in this embodiment. For this purpose, a further movement of the shifting element and/or actuating element from the preliminary first position $P'_1$ to the first position $P_1$, which is made possible by the elimination of the locking, is required. In this regard, it may be necessary that an actuation of the shifting element is not possible above a certain force threshold, or that the spring element or a second spring element is provided between the actuating element and the shifting element, so that the shifting element is only moved to the first position $P_1$ when the locking is released. The distance between the preliminary position $P'_1$ and the first position $P_1$ can be referred to as Ds and is preferably just the length of the maximum spring travel sF.

When the parking lock unit is coupled to the drive wheel, it is sufficient that the actuating element has moved to the second axial position $P_2$ in order to determine the parking state, as described above. Even in the event of a locking, the parking state can be considered as engaged here. An additional travel by the distance Ds is explicitly not necessary here. In order to prevent a mistake from occurring when the parking state is detected, the distance between the torque interfaces of the drive wheel and the parking lock unit is increased precisely by this additional travel. In a further development of the disclosure, the axial distance sP between the torque interfaces of the parking lock unit and the drive wheel is therefore greater, preferably greater by the maximum spring travel sF, than the axial distance sA between the torque interfaces of the drive wheel and the drive motor.

It has also been found that it is particularly advantageous if the shifting sleeve has an inner toothing and the drive motor, the drive wheel and the parking lock unit have an outer toothing as torque interfaces. To this end, the drive motor, the drive wheel and the parking lock unit have the outer toothing on the outer circumference of an output gear, a drive gear and a fixed gear. All toothings have a common axis along which the shifting sleeve can be displaced in order to selectively establish a non-rotatable coupling between the outer toothings of the output gear and drive gear or the drive gear and fixed gear in the manner of a claw clutch.

The method according to the disclosure for sequentially actuating a first claw clutch and a second claw clutch for the non-rotatable coupling of a drive wheel either with a parking lock unit or a drive motor provides that the second claw clutch of the parking lock unit is registered as actuated by a first displacement sensor when the first displacement sensor detects the shifting element in a second shifting position $P_2$, and that the first claw clutch for coupling the drive wheel to the drive motor is registered as actuated when a second displacement sensor registers the shifting sleeve in a first position $PS_1$ or the first displacement sensor detects the shifting element in a first shifting position $P_1$, wherein the first shifting position $P_1$ can be axially spaced apart from a preliminary first position $P'_1$ at which the shifting element comes to a stop in the event of a locking of the coupling between the drive wheel and the drive motor.

BRIEF DESCRIPTION OF THE DRAWINGS

Embodiments of the disclosure, to which the disclosure is not limited, and from which further features according to the disclosure may result, are shown in the following figures. In the figures:

FIG. 6 shows a drive train according to a second alternative of the disclosure with only one displacement sensor in a neutral state, FIG. 7 shows a drive train according to FIG. 6 in a non-secure driving state, FIG. 8 shows a drive train according to FIG. 6 in a secure driving state.

DETAILED DESCRIPTION

Figure 1:
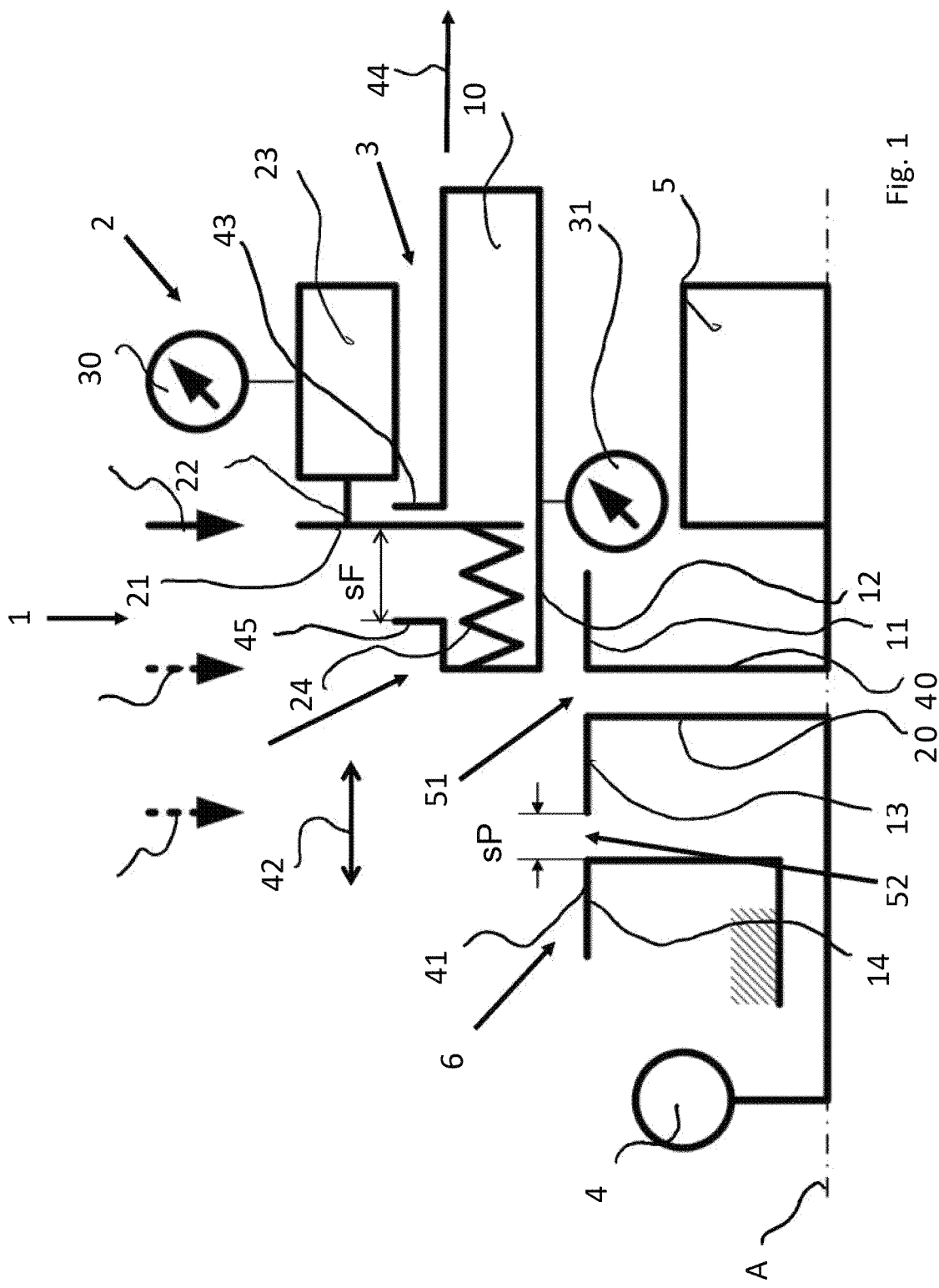
FIG. 1 shows a symbolic representation of a drive train with two displacement sensors.

FIG. 1 shows a drive train 1. The drive train 1 comprises a drive motor 5 for driving at least one drive wheel 4. The drive motor 5 can be an electric motor. In this regard, the torque from the drive motor 5 can be distributed to different drive wheels 4 by a differential, which is not shown here for the sake of clarity. The drive wheel 4 is shown here as an example for all drive wheels that a torque can be applied to.

Figure 2:
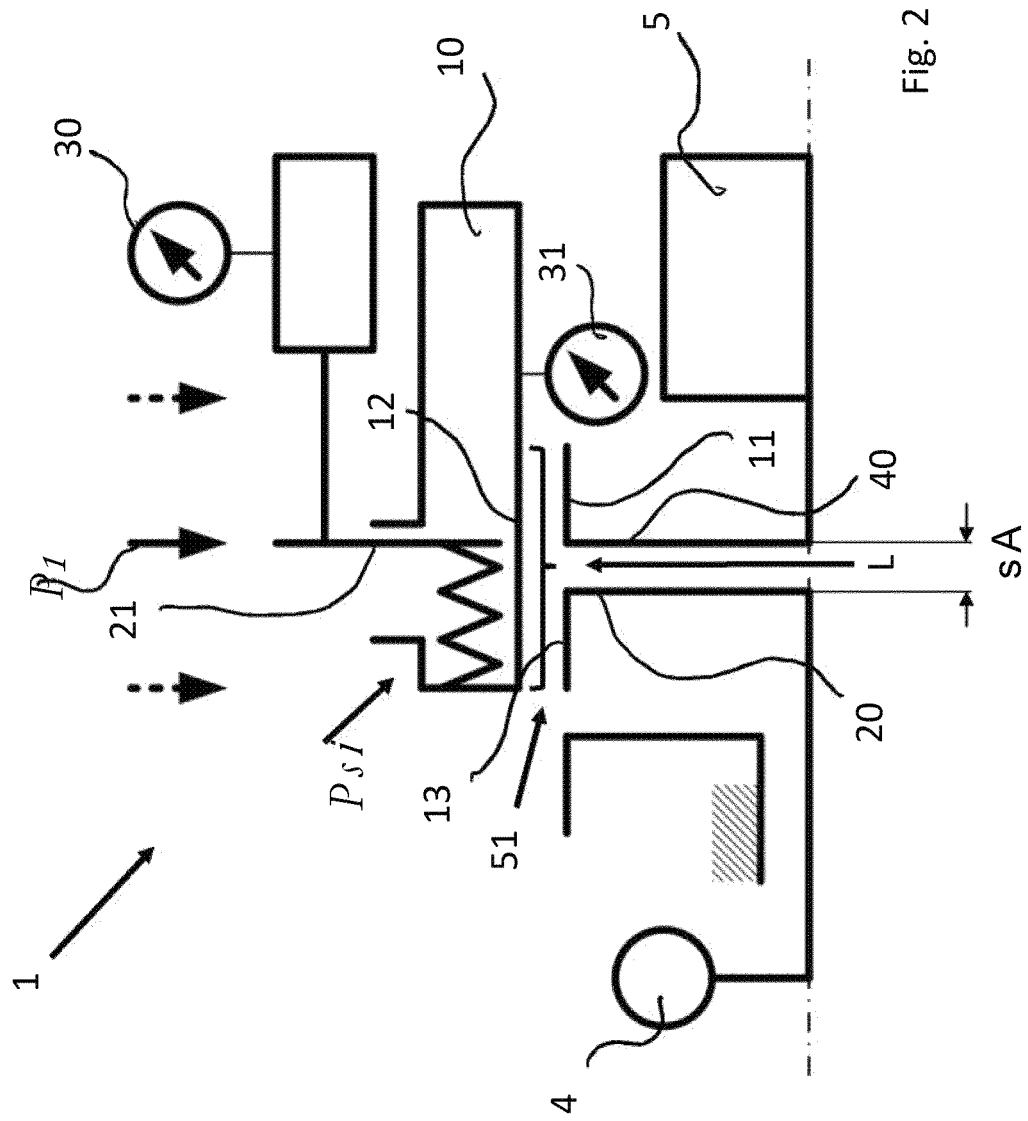
FIG. 2 shows a drive train according to FIG. 1 with a shifting sleeve in a position $PS_1$.

The drive motor 5 can be coupled to a drive gear 20 via an output gear 40. The drive gear 20 constitutes a connecting element between the drive wheel 4 and the drive motor 5. The output gear 40 and the drive gear 20 each have an outer toothing 11 and 13. These outer toothings 11 and 13 represent torque interfaces for coupling the drive motor 5 with the drive wheel 4. In this regard, the drive motor 5 is coupled to the drive wheel 4 in the manner of a claw clutch. A coupling device 3 is provided for this purpose, which comprises an axially displaceable shifting sleeve 10. In order to establish the coupling between the drive motor 5 and the drive wheel 4, the shifting sleeve can be axially displaced along the double arrow 42 by means of an actuating device 2. The shifting sleeve 10 has an inner toothing 12, which meshes with the outer toothing 11 of the output gear 40 in a neutral position PSN. In order to couple the drive motor 5 to the drive wheel 4, the shifting sleeve 10 is displaced axially along the axis A so that the inner toothing 12 meshes both with the outer toothing 11 of the output gear 40 and with the outer toothing 13 of the drive gear 20. The shifting sleeve 10 is then in a first position $PS_1$, as shown in FIG. 2. Here, it establishes a torque-transmitting coupling between the drive motor 5 and the drive wheel 4 in the manner of a first claw clutch 51.

In order to displace the shifting sleeve 10 axially, it is connected to a shifting element 21 of the actuating device 2. The shifting element 21 can be a shifting fork, for example.

The connection between the actuating device 2 and the shifting sleeve 10 is designed to be spring-loaded in this regard. In the example selected here, a spring element in the form of a spring 24 is provided between the shifting sleeve 10 and the shifting element 21 for this purpose. The spring 24 can, for example, be a coil spring, disc spring or similar. The shifting element 21 is actuated by means of an actuating element 22. This can be the piston of a piston-cylinder unit, for example, but a lever element or pressure pot can also be provided. In alternative embodiments, the spring 24 can also be provided between the actuating element 22 and the shifting element 21, or two spring elements are provided both between the shifting element 21 and the shifting sleeve 10, as well as between the actuating element 22 and the shifting element 21. Additionally, the shifting sleeve 10 also has a second stop 45. If the spring 24 is compressed by the shifting element 21 by a predetermined travel sF, the shifting element 21 strikes against this second stop 45, which prevents further axial movement of the shifting element 21 and whereby the spring 24 can only be compressed by the predetermined travel sF.

In the direction of the double arrow 42, by displacing the shifting element 21, the shifting sleeve 10 can thus assume a first axial position $PS_1$, in which the shifting sleeve 10 couples the drive motor 5 and the drive wheel 4. This is shown in FIG. 2. For this purpose, the drive wheel 4 has the drive gear 20, which is arranged axially offset with respect to the output gear 40.

Figure 3:
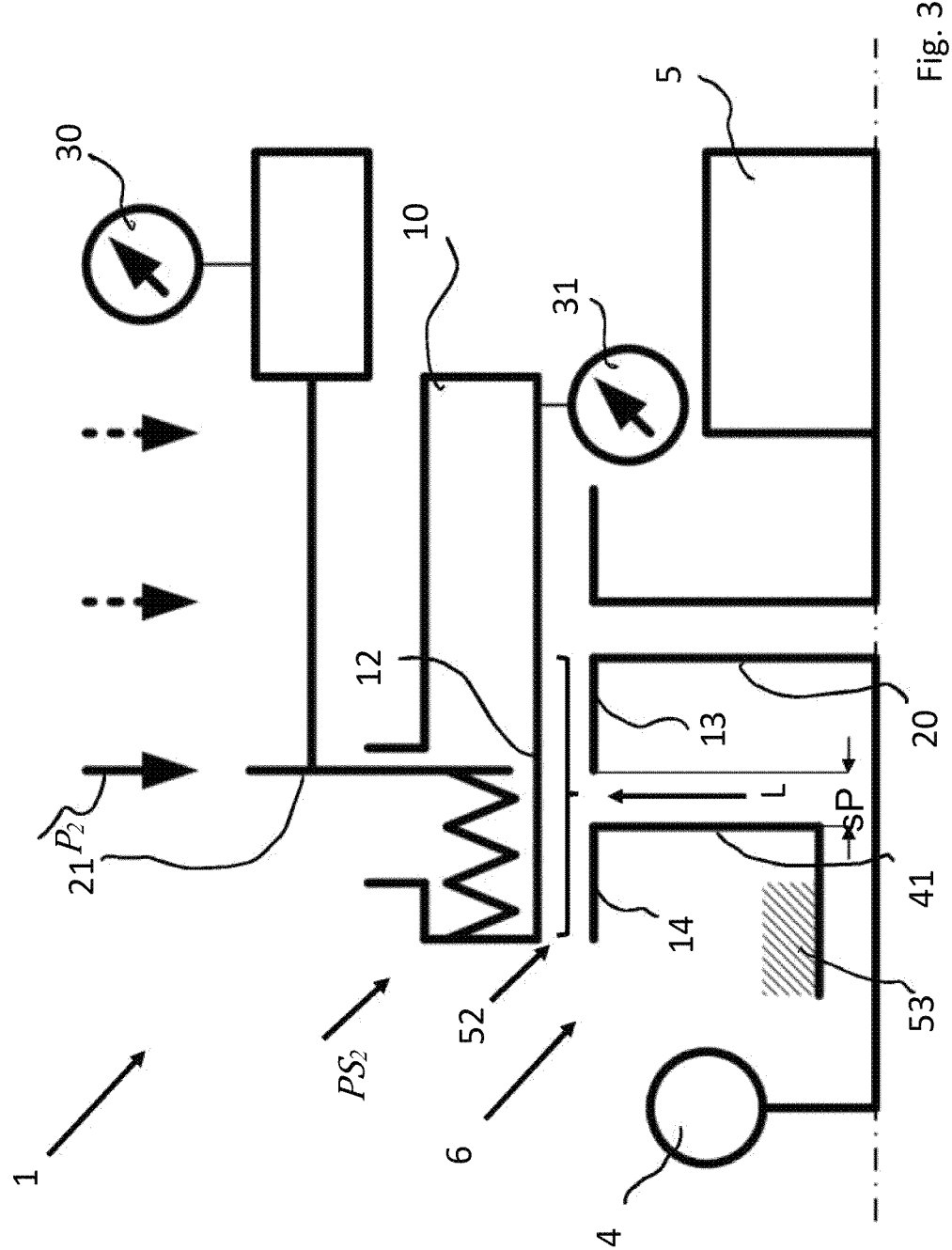
FIG. 3 shows a drive train according to FIG. 1 with a shifting sleeve in a position $PS_2$.

Axially offset with respect to the drive gear 20, a fixed gear 41 is provided in the drive train 1, which is part of a parking lock unit 6. The distance between the drive gear 20 and the fixed gear 41 is designated sP. If the shifting sleeve 10 is displaced further axially by means of the actuating device 2, the inner toothing 12 of the shifting sleeve 10 becomes disengaged from the outer toothing 11 of the output gear 40, so that there is no longer any coupling between the drive wheel 4 and the drive motor 5. The inner toothing 12 then engages with the outer toothing 14 of the fixed gear 41, while at the same time engaging with the outer toothing 13 of the drive gear 20. The shifting sleeve 10 thus constitutes a second claw clutch 52 for coupling the drive gear 20 to the fixed gear 41, or the drive wheel 4 to the parking lock unit 6. The fixed gear 41 is arranged fixed to the housing, for example connected to a transmission housing in a non-rotatable manner. For the coupling between the drive wheel 4 and the parking lock unit 6, the shifting sleeve 10 assumes a second axial position $PS_2$, as shown in FIG. 3.

For the axial coupling with the shifting element 21, the shifting sleeve 10 has a stop 43 with which the shifting sleeve 10 can be moved to the right in the direction of the arrow 44 in FIG. 1. In this way, the second claw clutch 52 can be opened, the first claw clutch 51 can be closed and finally the neutral position $P_N$ of the shifting sleeve 10 can be assumed in a sequential manner.

In the coupled state of the two claw clutches 51 and 52, the three positions of neutral position $PS_N$, first axial position $PS_1$ and second axial position $PS_2$ of the shifting sleeve 10 correspond to the three shifting positions $P_N$, $P_1$ and $P_2$ of the shifting element 21, as shown in FIG. 1. The assumption of these positions of the shifting element 21 can be detected by means of a directly or indirectly measuring displacement sensor 30, for example by measuring the distance traveled by the shifting element 21 or the actuating element 22. It is also possible with a rotor-driven actuating element 22 to take the angle of rotation of the rotor as a measure for an axial displacement of the shifting element 21. In the case shown here, an actuator drive 23 is used to displace the shifting element 21, which can be an electric motor or a hydraulic drive.

While FIG. 1 shows a neutral position $PS_N$ of the shifting sleeve 10, FIG. 2 shows the shifting sleeve in a position $PS_1$, in which the drive wheel 4 is coupled to the drive motor 5 via the first claw clutch 51. The shifting element 21 is in the first shifting position $P_1$. Torque can be transmitted from the drive motor 5 to the drive wheel 4 via the closed first claw clutch 51. The drive train 1 is in the driving state.

The inner toothing 12 of the shifting sleeve 10 has an axial extension L, so that both outer toothings 11 and 13 of the output gear 40 and drive gear 20 can engage with the inner toothing 12 at the same time. For this purpose, the axial extension L must also take into account the axial distance sA between the output gear 40 and the drive gear 20. The axial extension L essentially corresponds to the sum of the axial extent of the outer toothings 11 and 13 and the axial distance sA of the output gear 40 and the drive gear 20.

FIG. 3 correspondingly shows the shifting sleeve 10 in the second axial position $PS_2$, in which the second claw clutch 52 is closed and thus the drive wheel 20 is coupled to the fixed gear 41 in a manner fixed to the housing. The drive wheel 4 is firmly connected to the parking lock unit 6 and the drive train 1 is in the parking state. Accordingly, the shifting element 21 is in the second shifting position $P_2$.

The axial extension L of the inner toothing 12 is sufficient in order to couple the two outer toothings 13 and 14 of the drive gear 20 and fixed gear 41 to one another in a non-rotatable manner. The fixed gear 41 is connected in a non-rotatable manner to the transmission housing 53, whereby the drive wheel 4 is fixed and the drive train is in the parking state.

In all FIGS. 1 to 3, the spring 24 is in a relaxed state except for a slight basic preload, as the final states: neutral state in FIG. 1, driving state in FIG. 2 and parking state in FIG. 3 could be securely achieved.

Figure 4:
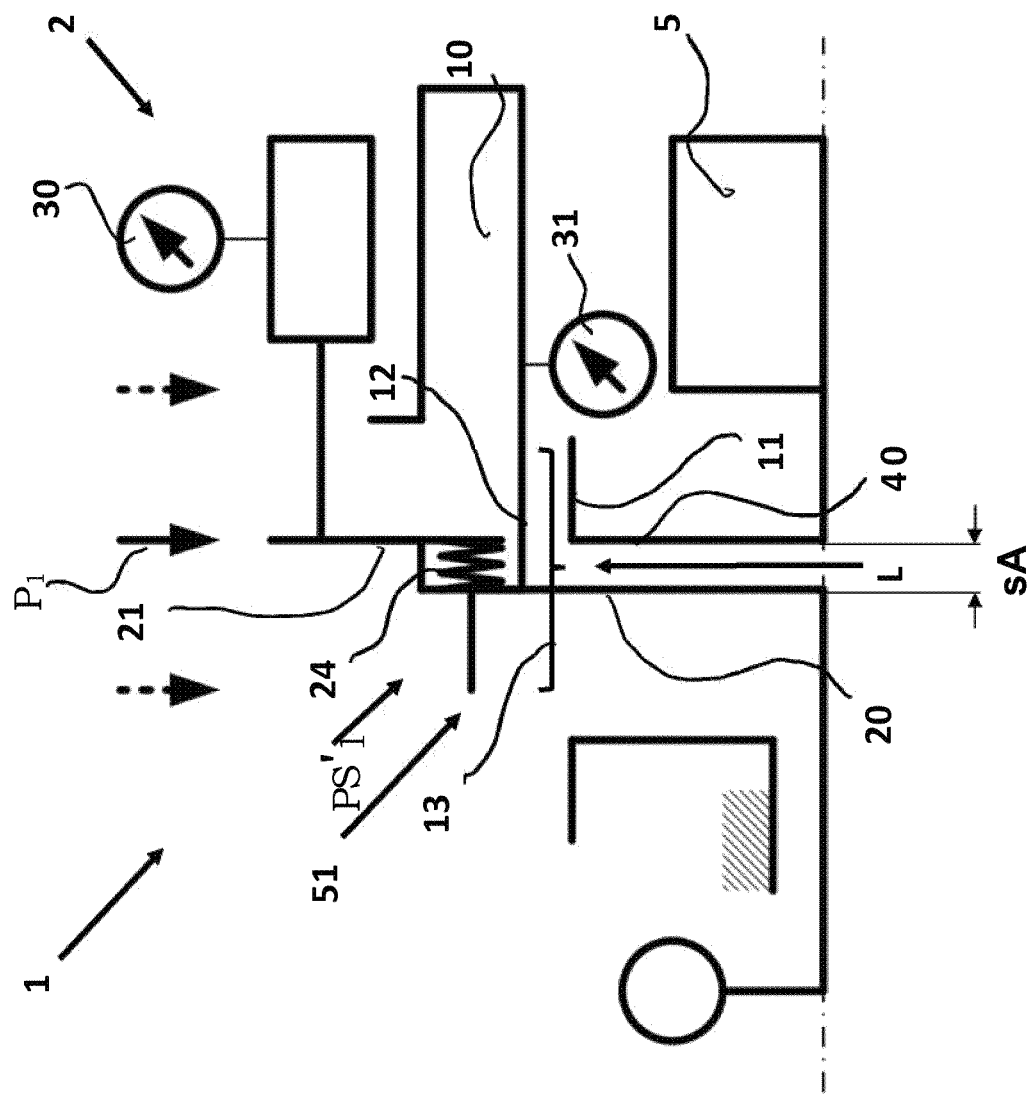
FIG. 4 shows a drive train according to FIG. 1 in a non-secure driving state.
Figure 5:
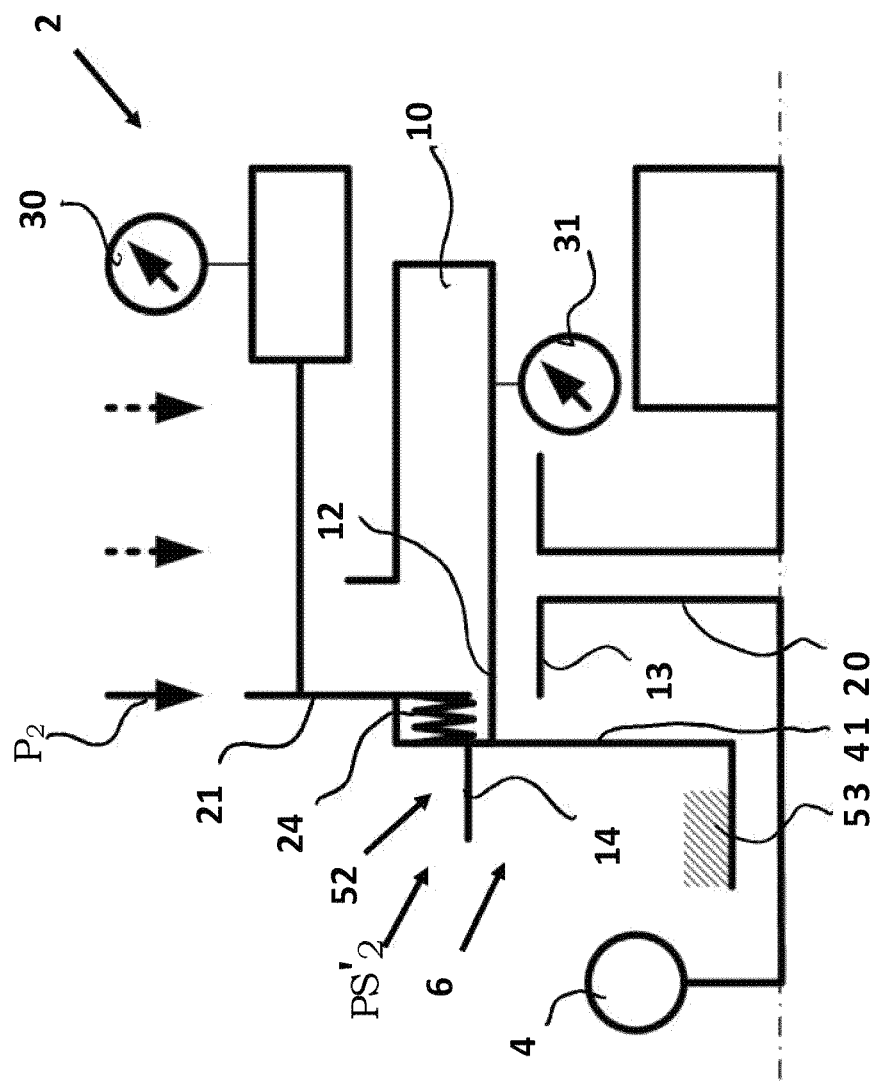
FIG. 5 shows a drive train according to FIG. 1 in a non-secure parking state.

The following FIGS. 4 and 5 each show states of the drive train 1 that are not securely engaged. In FIG. 4 this is the non-securely engaged driving state and in FIG. 5 the non-securely engaged parking state.

A non-securely engaged state is caused by a tooth-on-tooth position of the inner toothing 12 with the respective outer toothing 13 or 14 of the drive wheel 4 or the parking lock unit 6. This means that, in this state, the shifting element 21 is in the corresponding first or second shifting position $P_1$ or $P_2$ in each case. However, the tooth-on-tooth position makes it impossible for the shifting sleeve 10 to assume the axial position $PS_1$ or $PS_2$ required for the driving state or parking state. In each case, the shifting sleeve 10 remains in an axially upstream preliminary first position $PS'_1$ without closing the first claw clutch 51 and establishing the driving state, as shown in FIG. 4, or in a preliminary second position $PS'_2$, as shown in FIG. 5. In the preliminary second position $PS'_2$, the second claw clutch 51 is not yet closed, although the shifting element 21 is already in the corresponding second shifting position $P_2$.

In FIG. 4, the shifting element 21 assumes the shifting position $P_1$ required for actuating the first claw clutch 51, which is detected by the first displacement sensor 30. In an example embodiment, a second displacement sensor 31 is provided in the region of the shifting sleeve 10 in order to prevent a false detection of a driving state by a control system not shown.

The second displacement sensor 31 can be used to securely detect when the shifting sleeve 10 has reached the first axial position $PS_1$ and thus the coupling of the drive wheel 4 and drive motor 5. In the case of FIG. 4, it can thus be detected that at least the first axial position $PS_1$ has not been engaged. Incorrect control of the drive motor 5, which could lead to damage, can thus be prevented. The second displacement sensor 31 can further determine which exact position is occupied by the shifting sleeve 10, in this case the preliminary first position $PS'_1$, wherein this is not necessary here, however. A different sensor can therefore be used for the second displacement sensor 31 than for the first displacement sensor 30, which must be able to detect different positions of the shifting element 21.

If, starting from FIG. 4, the vehicle with the drive train 1 is moved further so that the position of the drive gear 20 and thus the outer toothing 13 changes, the inner toothing 12 of the shifting sleeve 10 is pushed into the outer toothing 13 by the tensioned spring 24 and the shifting sleeve 10 is displaced axially. This "correct" first axial position $PS_1$ of the shifting sleeve 10 is now detected by means of the second displacement sensor 31 and the driving state is determined as engaged. The control system can now control the drive motor 5 to transmit torque to the drive wheel 4.

FIG. 5 shows the parking state of the drive train 1, which is not yet securely engaged. The shifting element 21 is in the second shifting position $P_2$. The shifting sleeve 10 is in the preliminary second position $PS'_2$ and the spring 24 is under maximum tension. In this case, the preliminary second position $PS'_2$ could be detected by the second displacement sensor 31, but since an incorrectly detected parking state of the drive train 1 does not lead to any faults or damage, the displacement sensor 31 can, at least in a further alternative, be designed in such a way that it is not designed to detect the preliminary second position $PS'_2$. In the tooth-on-tooth position shown, a slight displacement of the inner toothing 12 in the circumferential direction is sufficient so that the second claw clutch 52 is closed and the parking state is established by displacing the shifting sleeve 10 via the spring 24 from the preliminary second position $PS'_2$ to the second axial position $PS_2$. Due to the coupling of the inner toothing 12 with the outer toothing 13, the rotation occurs due to the drive wheel 4 rolling away slightly.

FIG. 6 shows an alternative drive train 1' that enables a secure detection of the driving state even without a second displacement sensor 31. It can be seen here that the actuating device 2 further comprises a first displacement sensor 30 for detecting the shifting positions $P_N$, $P_1$ and $P_2$ of the shifting element 21. The coupling device 3, on the other hand, has no displacement sensor.

In order to securely detect the driving state, the axial distances and dimensions of the elements involved have been adapted such that it is now possible to securely detect the driving state solely by detecting the predetermined shifting positions $P_N$, $P_1$ and $P_2$ of the shifting element 21. Identical elements are designated here and in the following with the same reference signs as in the previous figures.

FIG. 6 shows the neutral state of the drive train 1'. The neutral shifting position $P_N$ of the shifting element 21 can be detected by the first displacement sensor 30 alone. The neutral shifting position $P_N$ always corresponds to the neutral position $PS_N$ of the shifting sleeve 10, so that the neutral state can be securely detected in this manner.

FIG. 7 shows a driving state of the drive train 1' that is not securely engaged. The shifting element 21 can be displaced up to a preliminary first position $P'_1$. In the case shown, a tooth-on-tooth position of the inner toothing 12 of the shifting sleeve 10 and the outer toothing 13 of the drive gear 20 of the drive wheel 4 exists.

According to this alternative, this preliminary first position $P'_1$ is explicitly not detected as a driving state. In this case, the spring 24 is fully tensioned, i.e., by the maximum spring travel sF and the shifting element 21 strikes the second stop 45.

If the drive wheel 4 and thus the drive gear 20 or the drive motor 5 and thus the output gear 40 move a little further, the tooth-on-tooth position can be overcome and the first claw clutch 51 can be closed. This state is shown in FIG. 8.

FIG. 8 now shows the securely engaged driving state of the drive train 1'.

The shifting sleeve 10 is in the first axial position $PS_1$, in which the first claw clutch 51 is considered as securely engaged. In contrast to the preliminary first position $P'_1$ of the shifting element 21, however, it now had to be axially displaced further by a differential distance d according to this alternative embodiment. However, this was possible with the, now present, tooth-on-gap position of the inner and outer toothing 12 and 13 with the spring 24 relaxed.

The first displacement sensor 30 can now securely detect this first axial position $P_1$ of the shifting element 21, which differs from the preliminary first position $P'_1$, and thus also the driving state of the drive train 1 can be reliably inferred.

In an example embodiment, as described in FIGS. 1 to 5, the axial distances between the drive gear 20 and output gear sA and between the drive gear 20 and fixed gear 41 sP were equal. In the second alternative, if the distance sP between the fixed gear 41 and the drive gear 20 is too small, this could result in not only a torque-transmitting coupling between the drive wheel 4 and the drive motor 5 when the first claw clutch 51 is engaged, but also a simultaneous coupling with the fixed gear 4 of the parking lock unit 6. As in FIG. 8, the shifting sleeve 10 now projects beyond the drive gear 20 by the distance d in the driving state. In order to prevent a corresponding coupling with the fixed gear 41, the distance sP between the drive gear 20 and the fixed gear 41 is selected to be greater than the distance sA, preferably by the amount of the differential distance d.

In an example embodiment, the differential distance d just corresponds to the maximum spring travel sF that the spring 24 is compressed between the relaxed position within the shifting sleeve 10 as shown in FIG. 8 and the tensioned position when the shifting element 21 strikes against the second stop 45 as shown in FIG. 7.

Figure 9A:
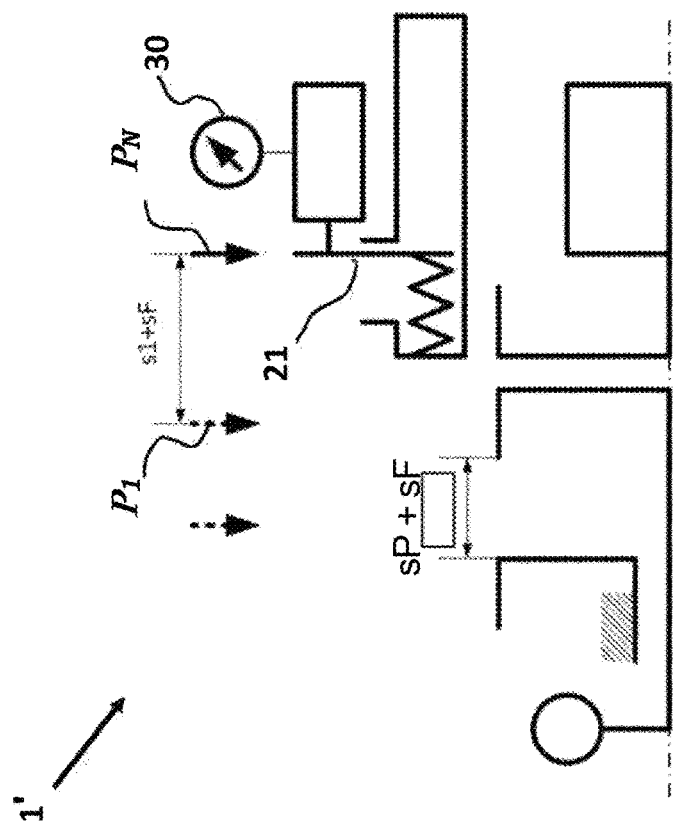
FIG. 9, 9a show a comparison of the relative distances of the drive trains according to FIG. 1 and FIG. 6.
Figure 9:
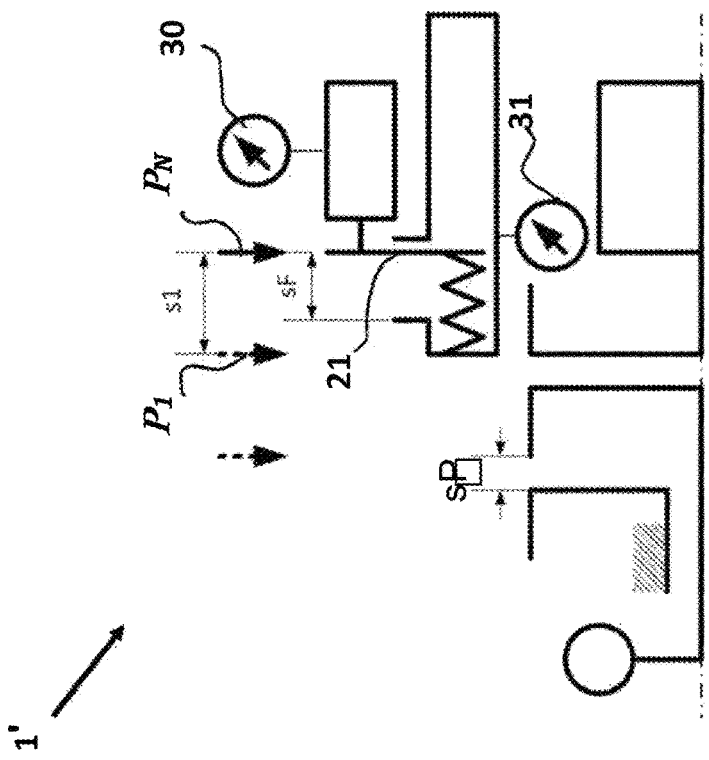

This increase in the distance sP between the fixed gear 40 and the drive gear 20 is shown in FIGS. 9 and 9a by way of example as a comparison between the two alternatives according to FIGS. 1 to 5 (see FIG. 9) and FIGS. 6 to 8 (see FIG. 9a). The first shifting position $P_1$ of the shifting element 21 displaces by the amount sF of the maximum spring travel. Meaning from the distance $s_1$ from the neutral shifting position $P_N$ to the distance $s_1+sF$ from the neutral shifting position $P_N$. Accordingly, the distance between the fixed gear 40 and the drive gear 21 is also increased by the same amount sF from sP to sP+sF.

According to this alternative embodiment, an axially wider structure of the gears 20, 40 and 41 is therefore accepted in order to securely detect the driving state solely by means of the first displacement sensor 30 without a second displacement sensor 31.

Figure 11:
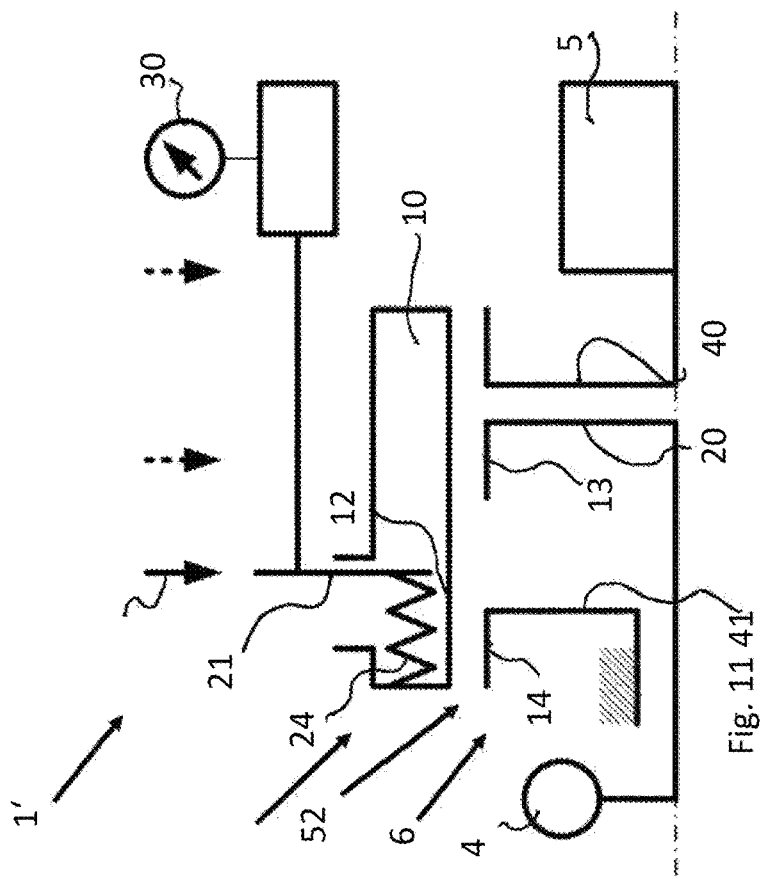
FIG. 11 shows a drive train according to FIG. 6 in a secure parking state.
Figure 10:
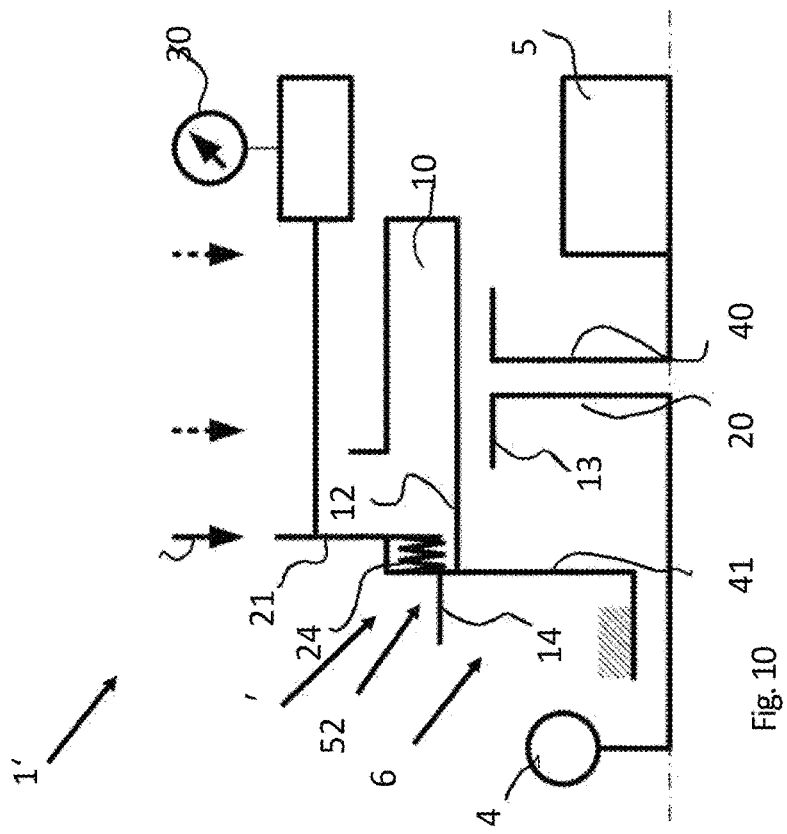
FIG. 10 shows a drive train according to FIG. 6 in a non-secure parking state.

For the sake of completeness, FIGS. 10 and 11 also show the states for a preliminary second position $PS'_2$ and second axial position $PS_2$ of the shifting sleeve 10, in which first a non-secure parking state is shown (FIG. 10) resulting from a tooth-on-tooth position of the outer toothing 14 and the inner toothing 12, which results in a tensioned spring 24, and then the secure parking state is shown (FIG. 11), in which this tooth-on-tooth position has been overcome due to a slight rotation of the drive gear 21 and the parking state has been securely engaged. As already explained for FIGS. 3 and 5, it is also not relevant here that the parking state is securely detected by the first displacement sensor 30. A detection of the second position $P_2$ of the shifting element 21, regardless of whether a secure or non-secure parking state has been reached, is completely sufficient for controlling the drive train 1'.

Due to the greater distance between the fixed gear 40 and the drive gear 20 and the resulting secure detection of the first shifting position $P_1$, which is now further away from the neutral shifting position $P_N$, it is possible to operate the drive train 1' with the combination of a drive motor 5 with an output gear 40, a drive wheel 4 with a drive gear 20 and a fixed gear 41 of a parking lock unit 6, which can be operated sequentially via a shifting sleeve 10 by successively engaging the shifting states of a first claw clutch 50 and a second claw clutch 52, securely with only a single displacement sensor 30 for detecting the position of the shifting element 21.

LIST OF REFERENCE SYMBOLS

1 Drive train
2 Actuating device
3 Coupling device
4 Drive wheel
5 Drive motor
10 Shifting sleeve
11 Torque interface, outer toothing
12 Torque interface, inner toothing
13 Torque interface, outer toothing
14 Torque interface, outer toothing
20 Connecting element, drive gear
21 Shifting element
22 Actuating element
23 Actuator drive
24 Spring element, spring
30 First displacement sensor
31 Second displacement sensor
40 Output gear
41 Fixed gear
42 Double arrow
43 First stop
44 Arrow
45 Second stop
51 First claw clutch
52 Second claw clutch
53 Transmission housing
PSN Neutral position
PS1 First axial position
PS'1 Preliminary first position
PS2 Second axial position
PS'2 Preliminary second position
PN Neutral shifting position
P1 First shifting position
P'1 Preliminary first position
P2 Second shifting position
P3 Third shifting position
L Axial extension
d Differential distance
8F Maximum spring travel
sA Axial distance
SP Axial distance
A Axis

The invention claimed is:

1. A drive train of a motor vehicle, comprising an actuating device configured for: i) actuating a coupling device for coupling at least one drive wheel to a drive motor, and ii) coupling the at least one drive wheel to a parking lock unit, and the coupling device comprises a shifting sleeve configured to be axially displaced via the actuating device, the drive motor has a first torque interface which, in a neutral position of the shifting sleeve, is coupled to a second torque interface of the shifting sleeve, the drive wheel has a connecting element which comprises a third torque interface to which the second torque interface of the shifting sleeve is coupled in a first axial position, the second torque interface of the shifting sleeve has an axial extension so that in the first axial position of the shifting sleeve, the second torque interface of the shifting sleeve configured for torque transmission from the drive motor to the drive wheel is coupled both to the first torque interface of the drive motor and to the third torque interface of the drive wheel, the parking lock unit has a fourth torque interface coupled with the second torque interface of the shifting sleeve in a second axial position of the shifting sleeve, the axial extension of the second torque interface is configured such that, in the second axial position of the shifting sleeve, the second torque interface of the shifting sleeve is coupled for torque transmission both to the fourth torque interface of the parking lock unit and to the third torque interface of the drive wheel, and the axial extension is configured such that at no time is the second torque interface of the shifting sleeve coupled both to the fourth torque interface of the parking lock unit and to the first torque interface of the drive motor, wherein the actuating device further comprises an actuator drive, a shifting element and an actuating element coupled to the actuator drive, the shifting element is coupled to the shifting sleeve and to the actuating element for axially displacing the shifting sleeve, at least one of coupling of the shifting element to the shifting sleeve or coupling of the shifting element to the actuating element is enabled via a spring element, the actuating device further comprises a first displacement sensor configured for acquiring a linear travel of at least one of the shifting element or the actuating element in an axial direction, and the coupling device further comprises a second displacement sensor configured for acquiring a linear travel of the shifting sleeve in the axial direction.

2. The drive train according to claim 1, wherein the first displacement sensor is configured for determining whether the shifting sleeve is coupled to the third torque interface of the drive wheel or to the fourth torque interface of the parking lock unit.

3. The drive train according to claim 1, wherein the coupling device is configured without displacement sensors.

4. The drive train according to claim 1, wherein the spring element is configured to be compressed by the shifting element to a maximum spring travel and an axial distance between the fourth torque interface of the parking lock unit and the third torque interface of the drive wheel is greater than an axial distance between the third torque interface of the drive wheel and the first torque interface of the drive motor.

5. The drive train according to claim 1, wherein:
the shifting sleeve has an inner toothing configured as the second torque interface,
the drive motor has an output gear with an outer toothing configured as the first torque interface,
the connecting element of the drive wheel is a drive gear with an outer toothing configured as the third torque interface,
the parking lock unit has a fixed gear fixed to a housing, and the fixed gear includes an outer toothing configured as the fourth torque interface,
the outer toothings of the output gear, the drive gear, and the fixed gear and the inner toothing have a common axis, and
when the inner toothing is axially displaced along the common axis, the inner toothing meshes with: i) the outer toothing of the output gear, or ii) simultaneously with the outer toothings of the output gear and the drive gear, or iii) simultaneously with the outer toothings of the drive gear and the fixed gear and via a claw clutch.

6. A method for sequentially actuating a first claw clutch and a second claw clutch for a non-rotatable coupling of a drive wheel via a parking lock unit arranged within a drive train, the drive train comprising an actuating device configured for: i) actuating a coupling device for coupling at least one drive wheel to a drive motor, and ii) coupling the at least one drive wheel to a parking lock unit, and the coupling device comprises a shifting sleeve configured to be axially displaced via the actuating device, the drive motor has a first torque interface which, in a neutral position of the shifting sleeve, is coupled to a second torque interface of the shifting sleeve—, the drive wheel has a connecting element which comprises a third torque interface to which the second torque interface of the shifting sleeve is coupled in a first axial position, the second torque interface of the shifting sleeve has an axial extension so that in the first axial position of the shifting sleeve, the second torque interface of the shifting sleeve configured for torque transmission from the drive motor to the drive wheel is coupled both to the first torque interface of the drive motor and to the third torque interface of the drive wheel, the parking lock unit has a fourth torque interface coupled with the second torque interface of the shifting sleeve in a second axial position of the shifting sleeve, the axial extension of the second torque interface is configured such that, in the second axial position of the shifting sleeve, the second torque interface of the shifting sleeve is coupled for torque transmission both to the fourth torque interface of the parking lock unit and to the third torque interface of the drive wheel, and the axial extension is configured such that at no time is the second torque interface of the shifting sleeve coupled both to the fourth torque interface of the parking lock unit and to the first torque interface of the drive motor, wherein the actuating device further comprises an actuator drive, a shifting element and an actuating element coupled to the actuator drive, wherein the shifting element is coupled to the shifting sleeve and to the actuating element for axially displacing the shifting sleeve, wherein at least one of coupling of the shifting element to the shifting sleeve or coupling of the shifting element to the actuating element is enabled via a spring element, wherein the second claw clutch of the parking lock unit is configured to be actuated via a first displacement sensor when the first displacement sensor detects the shifting element in a second shifting position, and the first claw clutch configured for coupling the drive wheel to the drive motor is actuated when a second displacement sensor detects the shifting sleeve in a first position or the first displacement sensor detects the shifting element in a third shifting position.

7. The method according to claim 6, wherein the method sequentially actuates the first claw clutch and the second claw clutch for a non-rotatable coupling of the drive wheel via the drive motor.

8. A drive train of a motor vehicle, comprising an actuating device configured for: i) actuating a coupling device for coupling at least one drive wheel to a drive motor, and ii) coupling the at least one drive wheel to a parking lock unit, and
- the coupling device comprises a shifting sleeve configured to be axially displaced via the actuating device, the shifting sleeve springably supported by a spring and configured with inner toothing having an axial extension, and
- the drive motor has an output gear with outer toothing,
- the drive wheel has a drive gear with outer toothing,
- the parking lock unit has a fixed gear with outer toothing, and
- in a neutral position of the shifting sleeve, the outer toothing of the output gear is coupled to the inner toothing of the shifting sleeve,
- in a first axial position of the shifting sleeve, the outer toothing of the drive gear is coupled to the inner toothing of the shifting sleeve, and
- in a second axial position of the shifting sleeve, the inner toothing of the shifting sleeve is: i) coupled to both the outer toothing of the fixed gear and the outer toothing of the drive gear, and ii) disengaged with the output toothing of the output gear,
- wherein the spring remains in a same preload state when the shifting sleeve is in the neutral position, the first axial position, and the second axial position.

9. The drive train according to claim 8, wherein the outer toothings of the output gear, the drive gear, and the fixed gear, and the inner toothing of the shifting sleeve are aligned on a common axis.

10. The drive train according to claim 8, wherein an axial distance between the outer toothing of the fixed gear and the outer toothing of the drive gear is greater than an axial distance between the outer toothing of the drive gear and the outer toothing of the output gear.

11. The drive train according to claim 8, wherein the actuating device further comprises:
- an actuator drive,
- a shifting element coupled to the shifting sleeve,
- an actuating element coupled to the actuator drive and the shifting element, and
- coupling of the shifting element to the shifting sleeve and/or coupling of the shifting element to the actuating element is enabled via the spring.

12. The drive train according to claim 11, wherein the actuating device further comprises a first displacement sensor configured for acquiring a linear travel of the shifting element and/or the actuating element in an axial direction.

13. The drive train according to claim 12, wherein the first displacement sensor is configured for determining whether the shifting sleeve is coupled to the outer toothing of the drive gear or to the outer toothing of the fixed gear.

14. The drive train according to claim 13, wherein the coupling device further comprises a second displacement sensor configured for acquiring a linear travel of the shifting sleeve in the axial direction.

15. The drive train according to claim 11, wherein the coupling device is configured without displacement sensors.

* * * * *